United States Patent

[11] 3,584,305

[72] Inventors Joseph Leostic
Le Mesnil Saint Denis;
Lucien Babany, Blanc Mesnil; Paul Bastide,
Le Vesinet, all of, France
[21] Appl. No. 760,854
[22] Filed Sept. 19, 1968
[45] Patented June 8, 1971
[73] Assignee C.I.T.-Compagnie Industrielle Des Telecommunications
Paris, France
[32] Priority Sept. 20, 1967
[33] France
[31] 121671

[54] FREQUENCY CONTROL SYSTEM FOR RECEIVER WITH HETERODYNE PRESELECTOR

9 Claims, 3 Drawing Figs.

[52] U.S. Cl. .......... 325/433
[51] Int. Cl. .......... H04b 1/36
[50] Field of Search .......... 325/418, 419, 420, 433

[56] References Cited
UNITED STATES PATENTS
2,589,387 3/1952 Hugenholtz .......... 325/418
3,456,196 7/1969 Schneider .......... 325/419

*Primary Examiner*—Robert L. Griffin
*Assistant Examiner*—Anthony H. Handal
*Attorney*—Craig & Antonelli

ABSTRACT: Receiver with a heterodyne preselector fed by a first local oscillator, oscillator, and a frequency converter having a manually controllable second local oscillator. In order to maintain the desired relation between the frequencies of the two local oscillators, the output signals therefrom are intermodulated and the frequency of the resulting signal maintained in a corresponding desired range of frequency by means of a circuit which, according to the value of the frequency of the resulting signal, (i) initiates a frequency sweep of the first local oscillator (ii) causes this frequency to be increased by a predetermined amount or (iii) causes this frequency to be decreased by a predetermined amount.

FREQUENCY CONTROL SYSTEM FOR RECEIVER WITH HETERODYNE PRESELECTOR

The invention relates to circuitry for the step-by-step frequency control of a receiver having a superheterodyne preselector covering a relatively wide band, so that it is capable of receiving a limited spectrum that can assume different positions within the wide band, the receiver having improved protection against powerful disturbances.

The sensitivity of receivers is limited by "noises" of diverse origin, and circuit noises in particular. A heterodyne receiver comprises a frequency converter which transposes into a fixed band the band of frequencies received by the antenna and which is generally variable within a more or less wide band. This provides a spectrum of "intermediate frequency." Such a frequency converter is in fact a modulator which receives at one input the high frequency signal from the antenna at a level that may drop to a microvolt, and at its other input a local frequency, so chosen that one of the products of modulation of the first order should yield the spectrum of "intermediate frequency," which is extracted by means of a suitable filter.

A classical-type modulator which operates with nonlinear conductors is inherently a powerful source of noise. Any increase in the sensitivity of a receiver involves bringing the received signal up to a sufficiently high level to exceed, for example by at least 20 decibels, the level of the "noise" generated in the modulator. A high frequency preamplifier covering a portion of the band that approximately corresponds to a spectrum to be received will reduce the signal-to-noise ratio but such a preamplifier is expensive and delicate in operation.

Another solution consists in utilizing a type of modulator which has become available more recently of the "parametric type," that is to say, it has a variable reactance supplied by diodes of variable capacity. Such a parametric modulator, fed with a "pumping signal," produces less noise than conventional modulators, and thus solves in principle one problem of the highly sensitive wide-band receiver.

In order, however, to derive full possible advantage from such a parametric modulator, the pumping signal must be of great purity, in other words, it must itself be free from "noise." Indeed, in addition to the wanted signal strength of some microvolts, the range of signals picked up by the antenna may include an intense parasitic signal of the order of 1 volt, acting as a disturbance. In these conditions the parametric modulator will function in reverse: the strong parasitic signal will play the part of the pumping signal, and the noise of the pumping oscillator will assume the role of the signal to be received. Hence it follows that in these conditions the noise of the pumping oscillator will penetrate the band received by the filter of intermediate frequency and be amplified in the following intermediate frequency amplifier. This noise, blanketing the useful signal, is more difficult to eliminate as there is no preselector at the input of the antenna tending to reduce the strong parasitic signal.

Consequently, the full sensitivity of a parametric converter of low noise acting as a preselector cannot be ensured in the presence of a powerful disturbance save by a pumping oscillator whose purity is of highest quality.

Now there exists a category of receivers, which are important in telecommunication engineering, where this condition is not generally fulfilled. It is those whose pumping signal is supplied by a synthesizer pegged in frequency by a phase fixing clamp to one frequency of a frequency spectrum of high stability provided commonly by a quartz crystal controlled oscillator. This is the case with numerous receivers operating on the single side band principle which requires a local oscillator of very high stability. Such a tuning noise is generated by the phase variation control, produced by the phase fixing device, serving to align the phase of a variable oscillator, which has a constant tendency to drift, with the phase of the quartz frequency that is stable. The noise generated depends partly on the quality of the variable oscillator and partly on its control circuitry. A simple calculation shows that, to ensure an advantage of 3 db. to an incident signal of 1 mv. in relation to a noise signal of 1 volt at a neighboring frequency, the purity of a pumping signal, say of 1 volt, should be of 120 db. Such purity can only be found in an extremely sophisticated oscillator, which is not subject to phase control so that the intrinsic noise of any fixed oscillator is avoided.

The use of a pumping frequency with the precision and stability of a quartz frequency, however, is a commanding necessity in a single side band working receiver which generally contains for this purpose a frequency synthesizer that yields, as has been seen above, a stable but "scintillating" frequency, that is to say, the quartz frequency signal may fluctuate in amplitude without change in frequency.

To overcome this difficulty it has been proposed to equip the receiver with a heterodyne-type preamplifier, comprising an amplifier of a narrow pass-band centered upon an ancillary intermediate frequency, the amplifier being placed between two frequency converters: a low-noise head converter, say of the parametric type, receiving the incident wave at a low level; and a following converter; these two converters being fed by a sophisticated oscillator of nonscintillating frequency, but comparatively low stability, and the rear converter supplying behind an adequate filter, the incident frequency at a high level to the input of a third frequency converter, fed with a synthesized frequency which is of high precision and high stability, but scintillating.

Such a receiver, however, has the disadvantage that it forces the operator to make two adjustments: an adjustment of the frequency of the synthesizer, and an adjustment of the frequency of the oscillator. In other words it lacks unified control.

The object of the invention is to provide an improved receiver in which the operator is provided with a single control for making frequency adjustments.

In accordance with the present invention a radio receiver has a heterodyne preselector fed by a first local oscillator which is ganged with a frequency converter having a manually controllable second local oscillator providing stable frequencies but susceptible to scintillation effects, the output frequency of the first local oscillator being controlled to maintain a predetermined relationship between its frequency and the output frequency of the second oscillator by a circuit which applies a filtered and amplified modulated output signal from the two local oscillator output frequencies to a frequency discriminator feeding one input terminal of a logic analog converter and to a detector feeding a second input terminal of the analog converter which controls with its output a stepwise voltage generator connected to apply to the first local oscillator a control voltage which is independent of scintillation effects of the second local oscillator and which varies to maintain the predetermined relationship between the output frequencies of the two local oscillators.

An advantage of the circuitry of the invention is that once a desired frequency from the first local oscillator has been obtained, preferably by applying the generator voltage to a variable capacity diode controlling the first local oscillator, the scintillation effects of the second oscillator are not reflected in the output voltage of the first oscillator as the control exercized is by way of a logic circuit rather than a physical continuous control connection.

Preferably the analog converter includes positive and negative threshold devices both connected to receive the output from the frequency discriminator and individually controlling separate logic circuits which determine the sense in which the control voltage applied to the first local oscillator is changed to maintain the predetermined relationship.

The invention will now be described in more detail, by way of example, with reference to the accompanying drawings, in which.

Before describing the drawings there are ranges of frequency transmitted by band-pass filters and oscillators and covering certain ranges of frequency having certain relationships which must first be defined. To assist explanation certain frequencies are given but it will be understood that these are only by way of example to assist comprehension of the invention and the invention is not in any way limited to the frequencies given below.

In the example being described:

Incident frequency $f_i$ 2—32 mc./s.
First intermediate frequency $f_1$ 108 mc./s.
Second intermediate frequency $f_2$ 40 mc./s.
Ancillary frequency $f_3$ 148 mc./s.
Frequency of variable oscillator ($f_4$) 106—76 mc./s.
Frequency of synthesizer ($f_5$) 42—72 mc./s.

These frequencies observe the following relationships:

$$f_1=f_i+f_4;\ f_2=f_5-f_i;\ f_3=f_4+f_5=f_1+f_2.$$

Figure 1:
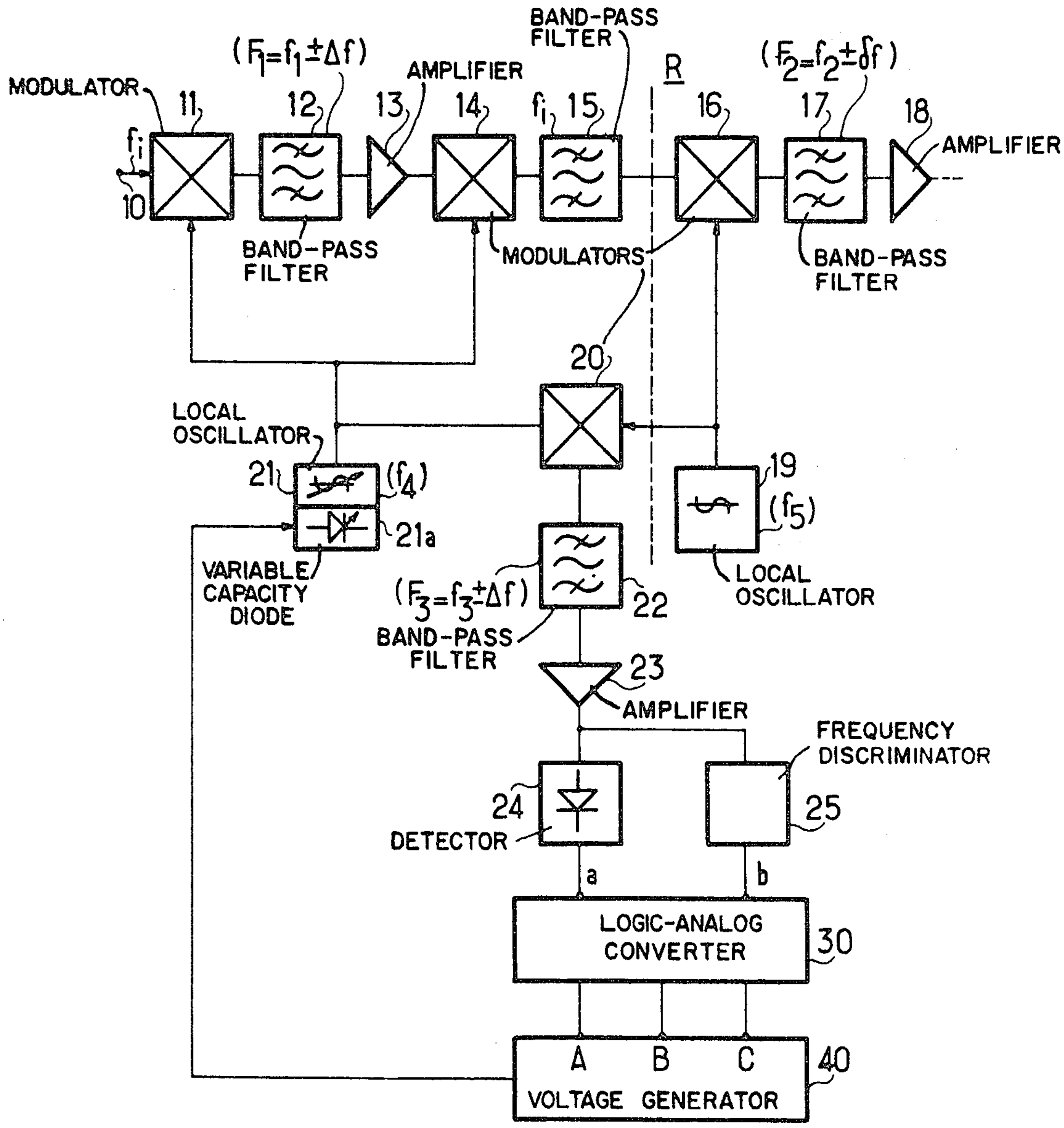
FIG. 1 is a schematic diagram of part of a receiver.

In FIG. 1 an incident frequency $f_i$ is applied to an input terminal 10 of a first modulator 11, which receives at another terminal the frequency $f_4$ supplied by a variable oscillator 21. A band-pass filter 12 transmits a frequency band $F_1=f_1\pm\Delta f$, to an amplifier 13 amplifying the band $F_1$. A second modulator 14 receives the band $F_1$ on one terminal and the same frequency $f_4$ on another. It supplies a demodulated signal to a second band-pass filter 15 at the frequency $f_i$, which has been accurately reconstituted, but at a level amplified relatively to the signal level at the terminal 10.

The filter 15 has its output applied to the input of a receiver R of a known type, comprising at the input a modulator 16, fed by a second local oscillator provided by a frequency synthesizer 19 of frequency $f_5$, a band-pass filter 17 having a band $F_2=f_2\pm\delta f$, an amplifier 18, and other known elements making up the receiver proper and with which the present invention is not concerned.

The oscillator 21 provides a variable frequency $f_4$ and operates with a variable capacity diode 21*a*. A modulator 20 receives on one terminal the frequency $f_4$ from the oscillator 21, and on another terminal the frequency $f_5$ from the synthesizer 19. The modulator 20 is connected to the input side of a band-pass filter 22, having a band $F_3=f_3\pm\Delta f$, and feeding an amplifier 23. The output of the amplifier 23 supplies a detector 24 and a frequency discriminator 25, whose output terminals are respectively connected to the input terminals *a* and *b* of a logic analog converter 30. The converter 30 applies logic signals to a step voltage generator 40 by way of three input terminals A, B, C. The step-voltage generator feeds its output signal to the variable capacity diode 21*a* and thus controls in steps, the frequency of the local oscillator 21.

Let us assume, for instance, that for a logic signal 1 applied to the terminal B, the step voltage generator 40 causes the frequency of the oscillator 21 to provide a rising scanning frequency in a recurrent manner within a given range by applying to the variable capacity diode 21*a* a suitable stepped voltage waveform, as is described more fully below. With a signal 1 applied to the terminal A, the generator 40, starting from a predetermined position, descends by steps and stops at a first new position. With a signal 1 applied to the terminal C, the generator 40, starting from a predetermined position, ascends by steps and stops at a second new position. With a signal O applied at A, B and C the generator 40 stays at a fixed step.

A step voltage generator capable of operating according to the foregoing scheme is known from the copending Pat. application of Joseph Leostic Ser. No. 757,441, filed Sept. 4, 1968.

The operation of the generator 40 associated with the logic converter 30 may be summed up in the following table:

| | | | | |
|---|---|---|---|---|
| A | 0 | 0 | 1 | 0. |
| B | 0 | 1 | 0 | 0. |
| C | 0 | 0 | 0 | 1. |
| Generator 40 | Fixed voltage output. | Continuous scanning voltage output. | −1 step. | +1 step. |

Figure 2:
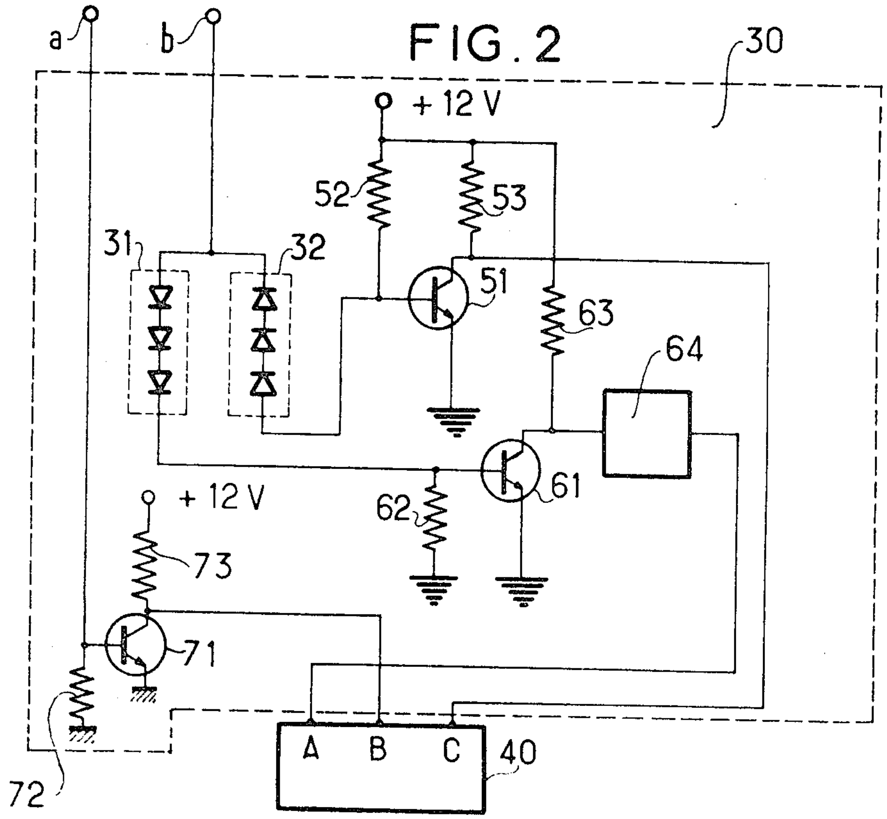
FIG. 2 is a detailed diagram of a part of FIG. 1.

FIG. 2 shows the logic analog converter to comprise an NPN transistor 71, whose base, grounded through a resistor 72, is also connected to input terminal *a*. The transistor collector is fed by a source of +12 volts through a resistor 73. The collector of the transistor 73 is also connected to the terminal B of the generator 40.

A threshold diode-chain device 31 of positive polarity is connected at its anode side to the input terminal *b* and at its cathode side to the base of a second NPN transistor 61 and through a third resistor 62 to ground. The collector of the transistor 61 is connected to the +12 volt source through a fourth resistor 63 and to the terminal A by way of a logic inverter 64.

A threshold diode-chain device 32 of negative polarity is connected at its cathode to the input terminal *b* and its anode to the base of a third transistor 51 biased at its base by a resistor 52 connected to the +12 volt source. The collector of the transistor 51 is also connected to the 12 volt source through a resistor 53 and to the terminal C of the generator 40.

The mode of operation of the device 30 of FIG. 2 is as follows:

The input terminal *a* receives a positive voltage when the frequency $F_3$ falls within the pass-band of the filter 22 (see FIG. 1) to make the transistor 71 conduct so that its collector falls towards ground potential: this is the logic state O of terminal B. When the frequency $F_3$ falls outside the pass-band of the filter 22, the transistor 71 is cut off and its collector is at +12 volts: this gives the logic state 1 at the terminal B.

In the absence of base excitation *via* the threshold device 31 the transistor 61 is cut off and its collector is at +12 volts. The inverter 64 then applies a O voltage to the terminal A to give the logic state O. If the threshold device 31 applies to the base of the transistor 61 a positive excitation voltage, the transistor 61 conducts and its collector drops to ground potential of O volt. The inverter 64 then applies a voltage of +12 volts to the terminal A to give the logic state *1*.

In the absence of base excitation *via* the threshold device 32 the transistor 51 conducts and its collector is at O volt. This corresponds to the logic state O being applied to the terminal C. If the threshold device 32 applies a negative excitation voltage to the base of the transistor 51, it is cut off and its collector applies a voltage of +12 volts to the terminal C to give the logic state 1.

Figure 3:
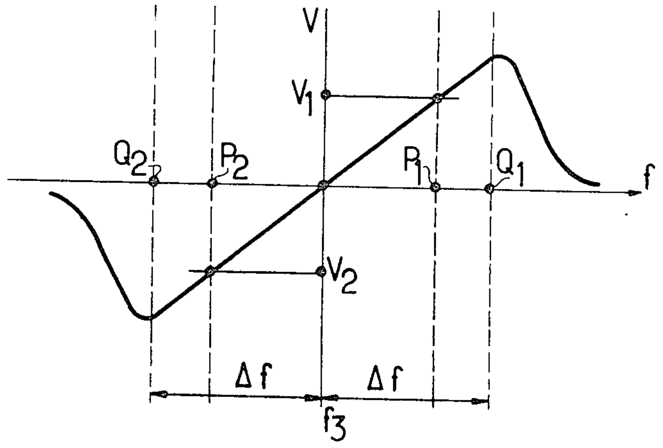
FIG. 3 is an explanatory graph.

FIG. 3 shows the characteristic curve of the frequency discriminator 25 showing the output voltage V as a function of the input frequency *f*. The frequency covers a band $f_3\pm\delta f$ which is the pass-band of the filter 22 in FIG. 1. The threshold device 31 is conductive for a voltage V exceeding a value of $+V_1$. The threshold device 32 is conductive for a negative voltage V greater, in the negative sense, than $V_2$. It will be seen that the threshold device 31 conducts within the frequency band marked $P_1Q_1$, and the threshold device 32 conducts within the frequency band marked $P_2Q_2$. In the example being described the frequency range $Q_1$—$Q_2$ is 30 kc./s. so that $\Delta f$ is 15 kc./s. The positive threshold device 31 is actually conductive between $f_3$+10 kc./s. and $f_3$+15 kc./s. and the negative threshold device 32 is conductive between $f_3$−10 kc./s. and $f_3$−15 kc./s. neither threshold device is conductive between $f_3$−10 kc./s. and $f_3$−10 kc./s.

The detector 24 covers the whole of the band $f_3\pm15$ kc./s.

The functioning of the installation of FIG. 1 is as follows:

1. If for a given value $f_5$ of the frequency of the synthesizer the frequency $f_4$ departs by more than ±15 kc./s. from the value that satisfies equation (1), a logic state 1 appears on the terminal B, the generator 40 operates continuously and supplies a voltage that rises by steps at the variable capacity diode 21*a*, which is equivalent to scanning the frequency of the oscillator 21. When the frequency $f_5$ is restored to within the 15 kc./s. range, logic state 1 on terminal B is restored to logic state O.

2. If the frequency $f_4$ has such a value that the frequency $F_3$ from the modulator 20 lies within the band $F_3=f_3\pm15$ kc./s. there are three possible cases:

a. if $F_3$ lies in the central band $f_3\pm10$ kc./s., the logical signal output from converter 30 will be O at A, O at B, O at C; the generator 40 then stops scanning and delivers a fixed output voltage.

b. if $F_3$ falls between $f_3-10$ kc./s., and $f_3-15$ kc./s., the logical signal output from converter 30 is O at A, O at B, and 1 at C: the output voltage of generator 40 moves on by a step in a sense appropriate for changing the frequency $f$ towards the center frequency $f_3$ in FIG. 3.

c. if $F_3$ is contained between $f_3+10$ kc./s. and $f_3+15$ kc./s., the logical signal output from converter 30 is 1 at A, O at B, O at C; the generator 40 output voltage moves by a step in the sense opposite to the preceding case (b) so as to bring the frequency $F_3$ back towards the center frequency $f_3$.

It will be seen that the circuitry described produces frequency steps of 20 kc./s. resulting in 1500 steps which cover a range of 30 mc./s. If the modulation covers a band of 3 kc./s., the oscillator 21 can deviate by 17 kc./s. without it being necessary to adjust the frequency, which corresponds on the basis of 100 mc./s. to an instantaneous stability of $1.7\times10^{14}$, a value that is readily obtainable with an oscillator of good quality.

The variable capacity diode 21*a* receives a rigorously continuous polarizing voltage: any trace of the scintillation affecting the frequency $f_5$ disappears in principle in the frequency $f_3$.

The generator 40 with 1500 steps should preferably be of an electronic type. With a range of voltage variation on the variable capacity diode taken, say, as 15 volts, voltage steps having a unitary value of the order of 10 millivolts are obtained in principle and can be comparatively easily realized.

The operator of the receiver need carry out only one operation, namely setting the frequency synthesizer as this single control governs operation of the oscillator 21, giving the frequency needed for amplifying the frequency transposed by the modulator with a low noise level, then returning it to its original value before it is treated in a single or analogous side band receiver.

We have shown and described several embodiments in accordance with the present invention. It is understood that the same is not limited thereto but is susceptible of numerous changes and modifications as known to a person skilled in the art and we, therefore, do not wish to be limited to the details shown and described herein, but intend to cover all such changes and modifications as are obvious to one of ordinary skill in the art.

We claim:

1. A radio receiver having a heterodyne preselector fed by a voltage variable first local oscillator, which preselector feeds a frequency converter having a manually controllable second local oscillator providing stable frequencies but susceptible to scintillation effects, the output frequency of the first local oscillator being controlled to maintain a predetermined relationship between its frequency and the output frequency of the second oscillator by a control circuit comprising modulating means connected to said first and second local oscillators for modulating the output signals therefrom, voltage generator means for providing a control signal to said first local oscillator to maintain the predetermined relationship between the output frequencies of the local oscillators, said control signal being provided in the form of a sweep voltage in response to a first actuation of said voltage generator means, in the form of a step voltage of first polarity in response to a second actuation of said voltage generator means, and in the form of a step voltage of second polarity in response to a third actuation of said voltage generator means, and logic control means connected between said modulating means and said voltage generator means for effecting first actuation of said voltage generator means in response to detection of variation of the output of said modulating means outside of a prescribed range and for effecting second and third actuation of said voltage generator means in response to detection of variation of the output of said modulating means to one and the other extremes of said prescribed range, respectively 2. A receiver as defined in claim 1 wherein said modulating means includes a modulator having respective inputs connected to said first and second local oscillators and an output connected to a band-pass filter capable of passing a band of frequencies forming said prescribed range and defining the maximum permissible variation of the combined outputs of said local oscillators.

3. A receiver as defined in claim 2 wherein said logic control means includes a detector connected to the output of said filter and a first logic circuit connected between said detector and said voltage generator means for effecting a first actuation of said generator means in absence of an output from said detector.

4. A receiver as defined in claim 1 wherein said logic control means includes a frequency discriminator connected to the output of said modulating means and a second logic circuit connected between said frequency discriminator and said voltage generator means for effecting a second or third actuation of said generator means in response to the output of said discriminator.

5. A receiver as defined in claim 4 wherein said second logic circuit includes positive and negative threshold devices to detect the polarity and a limit variation of the output of said discriminator and provide said second or third actuation, respectively, in response thereto.

6. A receiver as defined in claim 5 wherein said modulating means includes a modulator having respective inputs connected to said first and second local oscillators and an output connected to a band-pass filter capable of passing a band of frequencies forming said prescribed range and defining the maximum permissible variation of the combined outputs of said local oscillators.

7. A receiver as defined in claim 6 wherein said logic control means includes a detector connected to the output of said filter and a first logic circuit connected between said detector and said voltage generator means for effecting a first actuation of said generator means in absence of an output from said detector.

8 A receiver as defined in claim 7 wherein an amplifier is connected to the output of said filter and said detector and phase discriminator are connected in parallel to the output of said amplifier.

9. A radio receiver comprising: a heterodyne preselector and a frequency converter serially connected, said preselector and said converter being respectively fed by a first and a second local oscillator, said second local oscillator being manually controlled and said first oscillator comprising frequency-varying means for varying the frequency thereof by means of a control signal; first means, including a modulator, for deriving from the output signals of said two oscillators a further signal; second means for controlling the frequency of said first oscillator through providing to said frequency-varying means a first control signal initiating a frequency sweep of said first oscillator, in response to a first actuation of said second means, a second control signal causing a frequency increase, of predetermined amount, of said first oscillator, in response to a second actuation of said second means and a third control signal causing a frequency decrease, of predetermined amount, of said first oscillator in response to a third actuation of said second means; and third means connected between said first and second means for effecting first actuation of said second means in response to detection of variation of the frequency of said further signal outside of a prescribed range and for effecting second and third actuation of said second means in response to detection of variation of the output frequency of said further signal to one and the other extremes of said prescribed range, respectively.